United States Patent
Youn et al.

(10) Patent No.: US 7,925,023 B2
(45) Date of Patent: Apr. 12, 2011

(54) METHOD AND APPARATUS FOR MANAGING CRYPTOGRAPHIC KEYS

(75) Inventors: Paul Youn, Redwood City, CA (US); Daniel ManHung Wong, Sacramento, CA (US); Min-Hank Ho, Newark, CA (US); Chon Hei Lei, Alameda, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1193 days.

(21) Appl. No.: 11/367,812

(22) Filed: Mar. 3, 2006

(65) Prior Publication Data
US 2008/0019527 A1    Jan. 24, 2008

(51) Int. Cl.
*H04L 9/08* (2006.01)
(52) U.S. Cl. .................. 380/278; 380/277; 380/286
(58) Field of Classification Search ........... 380/277–286
See application file for complete search history.

(56) References Cited

U.S. PATENT DOCUMENTS 7,415,721 B2 * 8/2008 Fransdonk .................. 726/4
2003/0063750 A1 * 4/2003 Medvinsky et al. .......... 380/277

* cited by examiner

*Primary Examiner* — Kambiz Zand
*Assistant Examiner* — Amare Tabor
(74) *Attorney, Agent, or Firm* — Park, Vaughan, Fleming & Dowler LLP; Shun Yao

(57) ABSTRACT

One embodiment of the present invention provides a system for managing keys. During operation, the system authenticates a client at a key manager. Next, the system receives a token from the client at the key manager, wherein the token is associated with a customer key, and includes a token authenticator. This token authenticator comprises one-half of an authenticator pair which is used to determine if the client is the owner of the customer key. Next, the system decrypts the token using a master key. The system then verifies a client authenticator, which comprises the other half of the authenticator pair which is used to determine if the client is the owner of the customer key. If the client is the owner of the customer key, the system sends the customer key to the client, which enables the client to encrypt/decrypt data. Finally, the client deletes the customer key.

25 Claims, 10 Drawing Sheets

A = CUSTOMER KEY
B = TYPE VECTOR
C = AUTHENTICATOR
MK = MASTER KEY
{X}_MK = X ENCRYPTED WITH MK
HASH(X) = HASH OF X
| = CONCATENATION OPERATION
XOR = EXCLUSIVE OR OPERATION

LEGEND 1100

{A XOR (B | C) | HASH(A)}_MK

TOKEN 1102

{A | B | C | HASH(A | B | C)}_MK

TOKEN 1104

{A XOR (B | C) | HASH(A XOR (B | C))}_MK

TOKEN 1106

FIG. 11

METHOD AND APPARATUS FOR MANAGING CRYPTOGRAPHIC KEYS

BACKGROUND

1. Field of the Invention

The present invention relates to computer security. More specifically, the present invention relates to a method and apparatus for managing cryptographic keys in a computing environment.

2. Related Art

In an effort to protect information from getting into the wrong hands, users often employ cryptographic techniques when storing and/or transmitting confidential information. For example, common cryptographic techniques typically involve using a decryption key to decrypt information that has been encrypted with a corresponding encryption key. Note that the decryption key and the encryption key can be the same key in some instances. By using these cryptographic techniques, the problem of protecting information is transformed into the problem of protecting cryptographic keys.

Each client or system that uses cryptographic techniques typically employs some type of strategy or mechanism to protect the corresponding cryptographic keys from unwanted distribution. However, management of cryptographic keys can be burdensome, especially for a client that rarely has need for a cryptographic key. Organizations that have many clients who require cryptographic keys often provide many different systems for protecting these cryptographic keys. This can result in a large amount of time and resources being used to manage cryptographic keys. Additionally, a key management system may need to manage keys for many different clients, each of whom may have different requirements. These different requirements can greatly increase the complexity of a key management system.

Hence, what is needed is a method for managing cryptographic keys without the problems listed above.

SUMMARY

One embodiment of the present invention provides a system for managing keys. During operation, the system authenticates a client at a key manager. This authentication is performed using a client authenticator, wherein the authenticator identifies the client, and is one half of the authenticator pair that is used to determine if the client is the owner of the customer key. Next, the system receives a token from the client at the key manager, wherein the token is associated with a customer key, and includes a token authenticator. This token authenticator comprises the other half of the authenticator pair which is used to determine if the client is the owner of the customer key. The token authenticator can be related to the previously authenticated identity. Next, the system decrypts the token using a master key, and obtains the plaintext token authenticator. The system then verifies that the token authenticator corresponds with the previously supplied client authenticator. If the client is the owner of the customer key, the system sends the customer key to the client, which enables the client to encrypt/decrypt data. Finally, the client can delete the customer key.

In a variation on this embodiment, the system first creates the customer key and the token. This process begins when a client authenticates to the key manager using their client authenticator. Next, the client requests a customer key at the key manager. The system also receives a request for a token. Note that the request for the token may be separate from, or included with, the request for the customer key. In response to the requests, the system creates a customer key and the token, wherein the token authenticator is created in a manner that ties it to the client authenticator. Next, the system sends the customer key and the token to the client. Finally, the system saves the token at the client.

In a variation on this embodiment, the client can refer to multiple parties such as a group or a set of users. In another variation on this embodiment, the token authenticator can be tied to multiple clients.

In a variation on this embodiment, the system receives a request from an administrator to setup a secret key store, wherein the secret key store is used by the key manager to store the customer key and/or the token. In response to this request, the system sets up the secret key store and may create a master key, wherein the master key can be used by the key manager to encrypt/decrypt the token. In a variation on the present embodiment, tokens and keys may be stored on the server, as well as being provided to the client.

In a variation on this embodiment, the token can include: a customer key, a token authenticator, a type vector, and a checksum, wherein the checksum is a hashed portion, signature, or other integrity check of the token which facilitates identifying a tampered token.

In a variation on this embodiment, the token is encrypted with the master key. This master key can be generated randomly by the key manager, or specified by an administrator.

In a variation on this embodiment, the token authenticator and the client authenticator can include at least one of: a user name, a password, a certificate, an Internet Protocol address of the client, a hard-coded identifier, an identification number, a question response, a formula result, and a checksum of the authenticator. In a further variation, the token authenticator and the client authenticator can include and combination of the above-mentioned items to designate multiple clients.

In a variation on this embodiment, the key manager does not send the customer key to the client, but instead sends a message to the client indicating that the customer key is available at the key manager for use by the client.

In a further variation, the system receives data from the client for encryption/decryption with the customer key. The system then sends the encrypted/decrypted data from the centralized key manager to the client.

In a further variation, the key manager sends the token to the client, but does not send the customer key to the client.

In a further variation, the system receives data from the client at the key manager for encryption with the customer key. Next, the system sends the encrypted data to the client. The system then saves the token at the client.

In a further variation, the key manager sends the customer key to the client but does not send the token to the client.

In a further variation, the system stores the token for the client, and retrieves the customer key for a client if the stored token authenticator matches the client presented client authenticator.

In a variation on this embodiment, verifying the client authenticator at the key manager involves examining a type vector to determine a token authenticator type, wherein the type vector is included in the token authenticator. The system then performs a client authentication technique, as indicated by the token authenticator type, to compare the token authenticator with the client authenticator. If the token authenticator matches the client authenticator, the system identifies the client as the owner of the customer key. If not, the system rejects the client as the owner of the customer key.

In a further variation, the type vector stores configuration information that may include: the token authenticator type, a customer key management method indicating whether the customer key is to be returned to the client or used by the key manager on behalf of the client, the owner of the customer key, an expiration value defining how long the token is valid, a checksum-creation rule indicating what part of the token is to be protected and what checksum method is to be used, a description of the key's allowed usage such as for data encryption or decryption, key material encryption or decryption, signatures, or any other key use, and a customer key type indicating the kind of key used and what function the key can be used for. Note that the token authenticator type indicates the form of the token authenticator, and the form of the token authenticator indicates both the kind of token authenticator used and whether the token authenticator is hashed, encrypted, or in plain text.

In a variation on this embodiment, the system verifies a first checksum associated with the token. Verifying the checksum involves determining if the token has been tampered with by first calculating a second checksum, wherein the second checksum is created in the same manner as the checksum was created. The system then compares the checksum with the second checksum. If the checksum and the second checksum match, the system accepts the token as having not been tampered with. If not, the system identifies the token as having been tampered with and rejects the client as the owner of the customer key. In the case that the checksum is a signature or other non-reproducible integrity check, the signature or integrity check is verified.

BRIEF DESCRIPTION OF THE FIGURES

FIG. 11 illustrates examples of tokens in accordance with an embodiment of the present invention.

DETAILED DESCRIPTION

Figure 1:
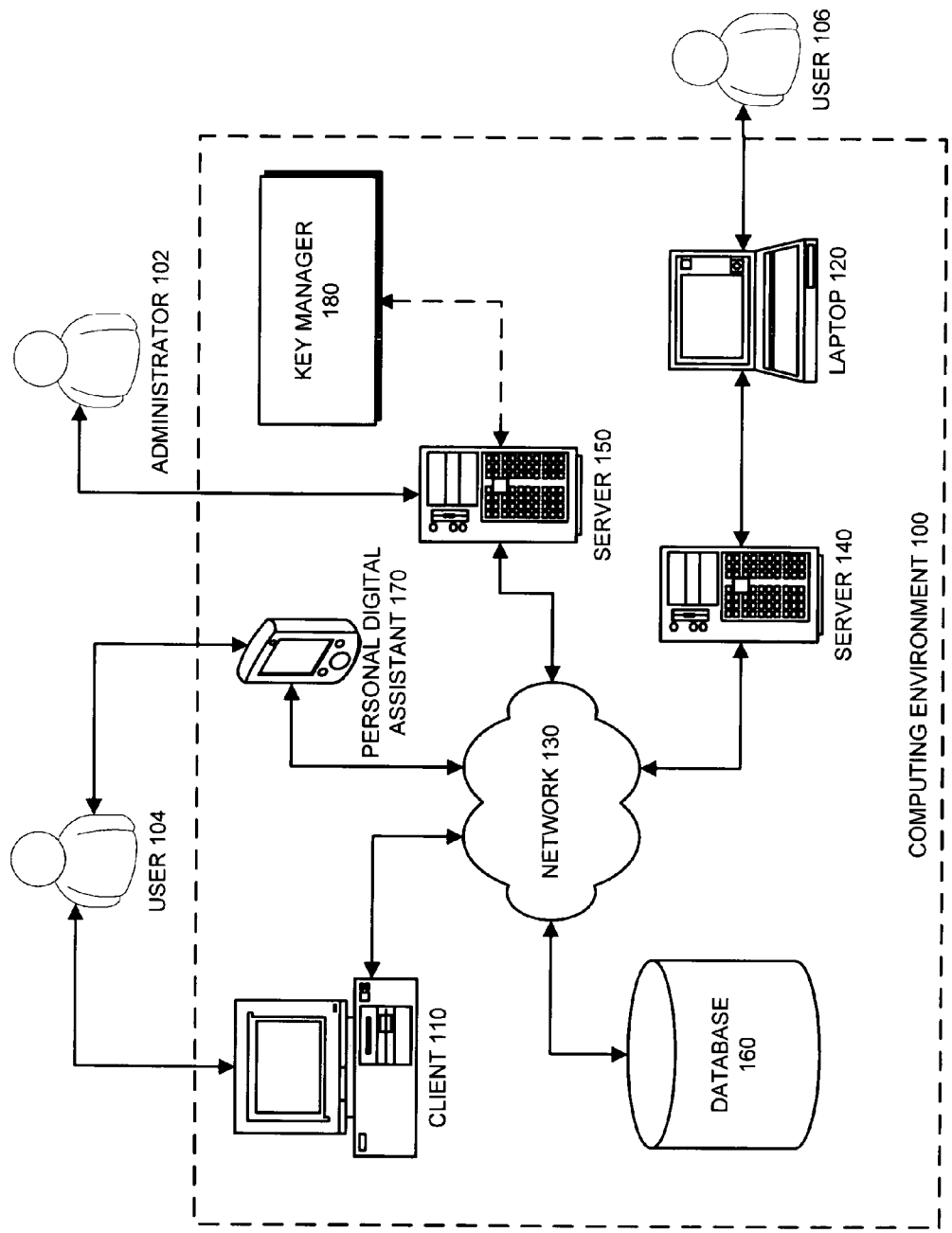
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Overview

One embodiment of the present invention provides a system for centrally managing keys. In one embodiment of the present invention, each time a client (user or automated system) requires a new cryptographic key, the client requests the cryptographic key, herein referred to as a customer key, from the key manager. The key manager then generates the customer key and a corresponding token which are both sent to the client. The token is encrypted with a special master key only available to the key manager. The token includes: a copy of the customer key, information used for identifying and verifying the owner of the customer key, and information used to verify the integrity of the token.

In one embodiment of the present invention, during operation of the system, a client sends a token and a client authenticator to the key manager. The key manager then uses a master key to decrypt the token, and uses the client authenticator to verify that the client is the owner of the customer key. The key manager then sends the customer key to the client, which the client uses to encrypt/decrypt some information. After the client has completed all tasks that require the customer key, and has optionally used the customer key to perform cryptographic operations, the client can then delete the customer key and save the token. The token can subsequently be used to re-obtain the customer key from the key manager should the client require the customer key again.

In one embodiment of the present invention, the key manager is a centralized system that can be used by any number of clients. By using the centralized key manager, individual clients do not need to expend resources to secure cryptographic keys. Furthermore, the centralized key manager reduces the number of key management systems required by an organization, thereby reducing the resources required to secure cryptographic keys.

In one embodiment of the present invention, the system can be implemented within existing authentication systems.

Computing Environment

FIG. 1 illustrates a computing environment 100 in accordance with an embodiment of the present invention. Computing Environment 100 includes client 110, laptop 120, network 130, server 140, server 150, database 160, personal digital assistant 170, and key manager 180. The dashed line connecting key manager 180 to server 150 indicates that key manager 180 is part of server 150.

In one embodiment of the present invention, key manager 180 is not part of server 150, but is instead a separate system that can communicate with other systems via network 130.

Client 110 and laptop 120 can generally include any node on a network including computational capability and including a mechanism for communicating across the network.

Network 130 can generally include any type of wired or wireless communication channel capable of coupling together computing nodes. This includes, but is not limited to, a local area network, a wide area network, or a combination of networks. In one embodiment of the present invention, network 130 includes the Internet.

Servers 140 and 150 can generally include any nodes on a computer network including a mechanism for servicing requests from a client for computational and/or data storage resources.

Database 160 can generally include any type of system for storing data in non-volatile storage. This includes, but is not limited to, systems based upon magnetic, optical, and magneto-optical storage devices, as well as storage devices based on flash memory and/or battery-backed up memory.

Personal digital assistant 170 can generally include any hand-held device including computational ability. This includes, but is not limited to, cellular phones, digital personal organizers, and personal electronic devices.

In one embodiment of the present invention, administrator 102 communicates with server 150 to set up key manager 180. In doing so, administrator 102 creates a secret key store on key manager 180 and generates a master key which is stored in key manager 180.

In one embodiment of the present invention, a user 104 requests a customer key from key manager 180 via client 10. In response to this request, key manager 180 generates a customer key and a token and sends both the customer key and the token to client 110. User 104 then encrypts an important document with the customer key at client 110, and proceeds to delete the customer key at client 110.

By using key manager 180, user 104 can make use of cryptographic keys without the danger of having the cryptographic key stolen. For example; user 106 is unable to steal the cryptographic key from user 104 even if user 106 has permission to interact with key manager 180. If user 106 attempts to send the token to key manager 180, key manager 180 will compare an authenticator stored in the token with an authenticator sent from user 106. If the authenticator sent by user 106 fails to match the authenticator stored in the token, key manager 180 will reject user 106 as the owner of the customer key stored in the token and will alert user 104 that user 106 attempted to gain access to the customer key that was generated specifically for the use of user 104.

In one embodiment of the present invention, a system, such as database 160, can request and utilize a customer key and token. In this embodiment, no user interaction is required.

Key Manager

Figure 2:
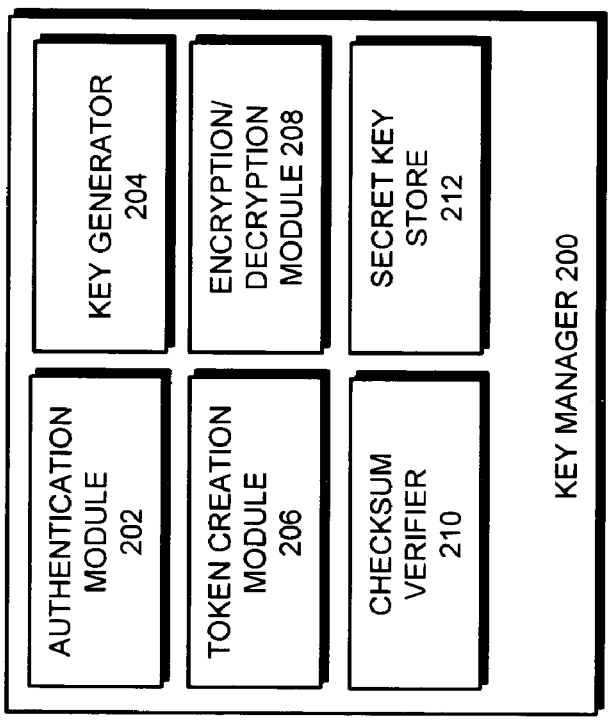
FIG. 2 illustrates a key manager in accordance with an embodiment of the present invention.

FIG. 2 illustrates a key manager 200 in accordance with an embodiment of the present invention. Key manager 200 includes authentication module 202, key generator 204, token creation module 206, encryption/decryption module 208, checksum verifier 210, and secret key store 212.

Authentication module 202 authenticates a client to determine if the client has permission to use the key manager. When key manager 200 receives or retrieves a token, authentication module 202 compares a client authenticator to a token authenticator stored within the received or retrieved token to determine if the client is the owner of the customer key stored within the token. In doing so, authentication module 202 uses authentication rules defined within the token to facilitate in determining if the client is the owner of the customer key stored within the token.

In one embodiment of the present invention, the module that authenticates a client and the module that determines if the client is the owner of the customer key are two independent modules.

Key generator 204 generates customer keys when a client requests a new key. Key generator 204 also generates the master keys that are used by key manager 200 to encrypt the tokens. These master keys are used only by the key manager and are not disseminated to clients.

In one embodiment of the present invention, the module that generates customer keys and the module that generates master keys are two independent modules.

In one embodiment of the present invention, master keys are specified by an administrator.

Token creation module 206 creates a token each time a customer key is requested. The token is then sent to the client and can be used by the client to request a copy of a previously created customer key associated with the token.

Encryption/decryption module 208 encrypts/decrypts the tokens that are generated by token creation module 206 and that are received by clients attempting to retrieve a customer key. Encryption/decryption module 208 can also encrypt/decrypt data received by the key manager.

In one embodiment of the present invention, the module used for encrypting/decrypting tokens and the module used for encrypting/decrypting data are two independent modules.

Checksum verifier 210 verifies that a token has not been tampered with by comparing a newly generated hash with a checksum stored within the token. If the token has been tampered with, key manager 200 sends an alert to the customer-key owner informing the customer-key owner of the attempt to obtain the customer-key owner's customer key. Note that while checksums are discussed in detail, the present invention is not meant to be limited to a checksum. Any mechanism for determining that the token has not been tampered with may be used.

In one embodiment of the present invention, an alert message is not sent to the owner of the customer key.

In one embodiment of the present invention, the customer key is not stored within the token. In this embodiment the customer keys are instead stored within secret key store 212, and the token includes a pointer to the location within secret key store 212 that contains the customer key associated with the token.

Token

Figure 3:
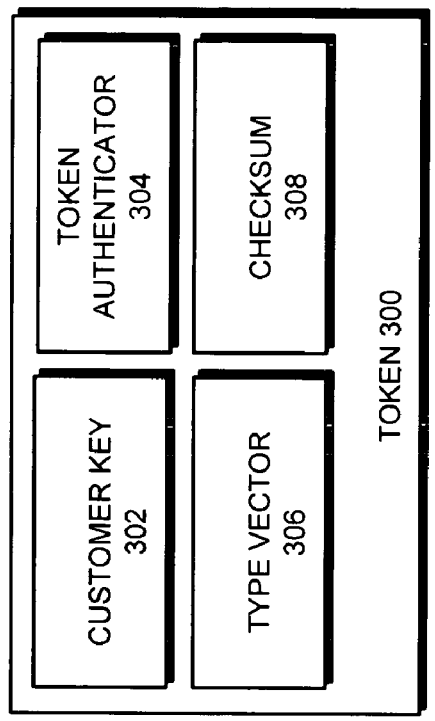
FIG. 3 illustrates a token in accordance with an embodiment of the present invention.

FIG. 3 illustrates a token 300 in accordance with an embodiment of the present invention. Token 300 includes customer key 302, token authenticator 304, type vector 306, and checksum 308.

Customer key 302 is a cryptographic key requested by a client and used to encrypt/decrypt data. Note that in one embodiment of the present invention there is no restriction on the kind of cryptographic key that can be used as customer key 302. Customer key 302 can be a cryptographic key generated by key manager 200 that is owned by a single client or a group of clients, and which is only to be used by the owner(s) of customer key 302.

Token authenticator 304 is an authenticator that facilitates in determining if a client is an owner of customer key 302. If a client owns customer key 302, the client should be able to provide a client authenticator to match token authenticator 304. If the client authenticator does not match token authenticator 304, key manager 200 can send an alert to the owner of customer key 302 informing the owner of the failed attempt by the client to obtain customer key 302.

Type vector 306 is a vector of configuration and identification information that is used to facilitate security of the customer key. After decrypting token 300 by using a master key, key manager 200 uses type vector 306 to identify how to proceed with the client verification, token 300 integrity check and customer key 302 dissemination processes.

Checksum 308 is a hash of a portion of the information stored in token 300. The checksum 308 is created during the token 300 creation process. The rules used to create checksum 308 and to verify the integrity of checksum 308 are defined by type vector 306. The creation of checksum 308 is not restricted to any particular technique for generating a checksum. For example, the checksum 308 can be created using a hash function, such as SHA-1, SHA-2 or MD5. Furthermore, any formula can be used to combine the information used to create checksum 308. Moreover, not only can any portion of token 300 illustrated in FIG. 3 be used in checksum 308, but any additional piece of data, identifier, or tag can be included both in token 300 and in checksum 308. Note that any part of token 300 used to create checksum 308 is also stored in token 300 in an unadulterated form for the purpose of repeating the process of creating checksum 308. Checksum 308 facilitates in determining if token 300 has been tampered with.

In one embodiment of the present invention, checksum 308 can be created by performing an exclusive-OR operation on the second half of customer key 302 and the second half of token authenticator 304, and then concatenating the result with type vector 306. The result of the concatenation operation can then be hashed using SHA-2 and used as checksum 308.

In one embodiment of the present invention, checksum 308 can be encrypted before token 300 is encrypted.

In one embodiment of the present invention, an identifier for the method used for generating checksum 308 is stored in type vector 306. Key manager 200 can then repeat the process of generating checksum 308 with the copy of the token received from the user to determine if token 300 was tampered with. In this way, checksum 308 facilitates preventing a client from tampering with token 300 and altering token authenticator 304 to forge ownership of customer key 302.

Authenticator

Figure 4:
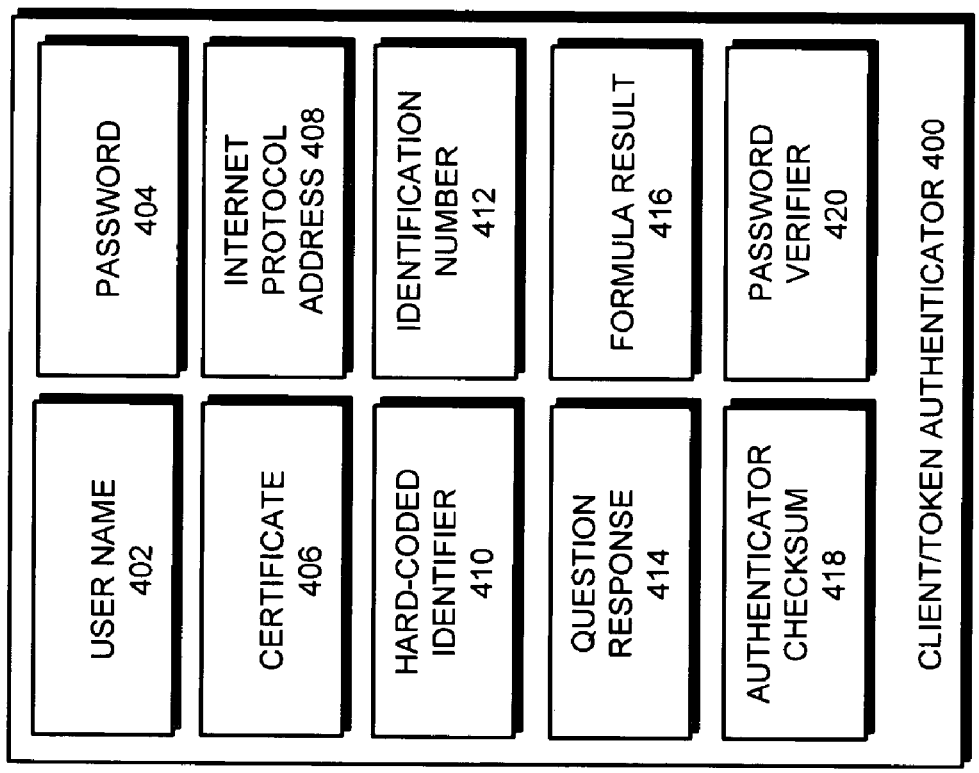
FIG. 4 illustrates a client/token authenticator in accordance with an embodiment of the present invention.

FIG. 4 illustrates a client/token authenticator 400 in accordance with an embodiment of the present invention. Client/token authenticator 400, herein referred to as authenticator 400, includes user name 402, password 404, certificate 406, Internet Protocol Address 408, hard-coded identifier 410, identification number 412, question response 414, formula result 416, authenticator checksum 418, and password verifier 420. Note that any information that can be used to authenticate a client can be included in authenticator 400. Moreover, an authenticator is not required to include all the fields of authenticator 400. The authenticator is used to determine if a client is the owner of customer key 302. The client seeking access to customer key 302 must provide a client authenticator that matches a token authenticator in order to receive customer key 302. In this way, authenticator 400 helps prevent a client that has stolen token 300 from obtaining customer key 302.

In one embodiment of the present invention, customer key 302 is not sent to the client. Instead, a message is sent to the client informing the client that they have permission to use customer key 302. If the client authenticator and the token authenticator match, the client is granted permission to use customer key 302.

User name 402 is the user name of a client.

Password 404 can be any type of password used to authenticate a client. Password 404 can be associated with user name 402, or can be used independently of user name 402.

Certificate 406 can be any digital certificate obtained from a certificate authority.

Internet Protocol address 408 is the Internet Protocol address of a client system or of a system that the client specified in the creation of token 300. If a client attempts to obtain customer key 302 from a system reporting a different Internet Protocol address than Internet Protocol address 408, key manager 200 will reject the client's request.

Hard-coded identifier 410 is a unique non-configurable value that has been built into the client. One example of a hard-coded identifier is a Media Access Control address (MAC address). In one embodiment of the present invention, hard-coded identifier 410 is a non-unique value, such as a customer identification number.

Identification number 412 is a unique value associated with a client. One example of an identification number is a social security number. In one embodiment of the present invention, identification number 412 is a non-unique value, such as a department identifier.

Question response 414 is the answer to a question posed to the client. The question is stored in type vector 306. There are no restrictions on the type of question posed to the client and on the question response 414. Moreover, the question posed to the client and the question response 414 can include multiple questions and question responses.

Formula result 416 is the result of a formula used to authenticate the client. The formula is stored in type vector 306. The formula can include any combination of fields in authenticator 400. Moreover, the formula can include additional fields not illustrated in authenticator 400, such as a time-range specifying when a client can be authenticated. The fields can be combined in any logical manner. For example, in one embodiment of the present invention, the formula is the exclusive-OR of identification number 412 and password 404, concatenated with the time of authentication.

Authenticator checksum 418 is a hash of the authentication fields in authenticator 400. Authenticator checksum 418 can use any type of checksum-producing formula. For example, a hash function such as SHA-1, SHA-2, or MD5 may be used.

In one embodiment of authenticator 400, the fields selected to be part of authenticator 400 are selected by the client when token 300 is created.

In one embodiment of the present invention, authenticator 400 can include biometric information.

Type Vector

Figure 5:
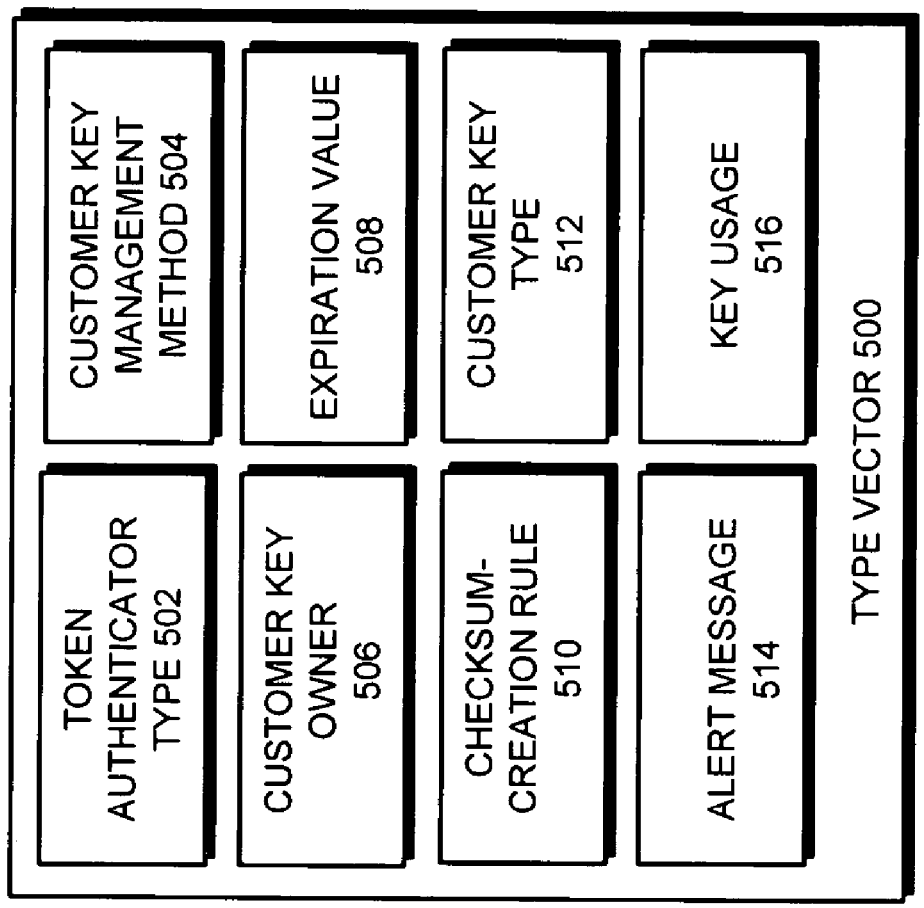
FIG. 5 illustrates a type vector in accordance with an embodiment of the present invention.

FIG. 5 illustrates a type vector 500 in accordance with an embodiment of the present invention. Type vector 500 includes configuration and identification information to be used by key manager 200 to facilitate in identifying the owner of customer key 302, and in authenticating the client requesting access to customer key 302. More specifically, type vector 500 includes token authenticator type 502, customer key management method 504, customer key owner 506, expiration value 508, checksum-creation rule 510, customer key type 512, alert message 514, and key usage 516. Note that type vector 500 can include any additional information that can facilitate in configuring token 300 and in identifying the owner of customer key 302. Moreover, a type vector is not required to include all the fields of type vector 500.

Token authenticator type 502 specifies what fields are included in authenticator 400. Token authenticator type 502 can also include information to assist in creating and validating authenticator 400. For example, token authenticator type 502 can include a question to present to the client in order to obtain question response 414.

Customer key management method 504 specifies how customer key 302 should be maintained. In one embodiment of the present invention, customer key 302 is stored within token 300.

In one embodiment of the present invention, customer key 302 is stored in secret key store 212. In this embodiment, customer key management method 504 includes a pointer to the secret key store 212 location where customer key 302 is stored. Customer key 302 can be stored either in encrypted token form, or as plaintext.

Customer key owner 506 specifies the owner of customer key 302. In one embodiment of the present invention, customer key owner 506 can specify more than one owner. In this embodiment, any client that is listed as an owner of customer key 302 can gain access to customer key 302.

Expiration value 508 specifies how long token 300 is valid. Once token 300 has expired, token 300 can no longer be used to obtain customer key 302. The expiration of token 300 facilitates in expiring customer key 302. If a client does not possess a copy of customer key 302, and if token 300 has expired, data that has been encrypted with customer key 302 cannot be retrieved, thus resulting in expiration of the data.

In one embodiment of the present invention, an administrator can retrieve customer key 302 even after token 300 has expired. In this embodiment, token 300 can only be purged from secret key store 212 by an administrator.

In one embodiment of the present invention, multiple master keys are generated to correspond to expiration dates. Once an expiration date is reached, the master key will be deleted making it impossible to recover the customer key from any token that was encrypted with that master key.

Checksum-creation rule 510 specifies what hashing techniques are used to create checksum 308. Checksum-creation rule 510 also specifies what portions of token 300 are to be included in checksum 308 and what technique is used to combine the portions of token 300 that are included in checksum 308. Checksum-creation rule 510 is also used to create a second checksum that is compared with checksum 308 to determine if token 300 has been tampered with.

Customer key type 512 specifies the type of customer key 302. For example, the type of customer key 302 can include both symmetric and asymmetric cryptographic keys.

Alert message 514 is the configuration of an alert sent to the owner of customer key 302 if an attempt is made to retrieve customer key 302 by a client that is not identified as the owner of customer key 302. Alert message 514 specifies the format of the alert, when to send an alert, and where to send the alert.

In one embodiment of the present invention, alert message 514 is an optional field of type vector 500.

Key Manager Configuration

Figure 6:
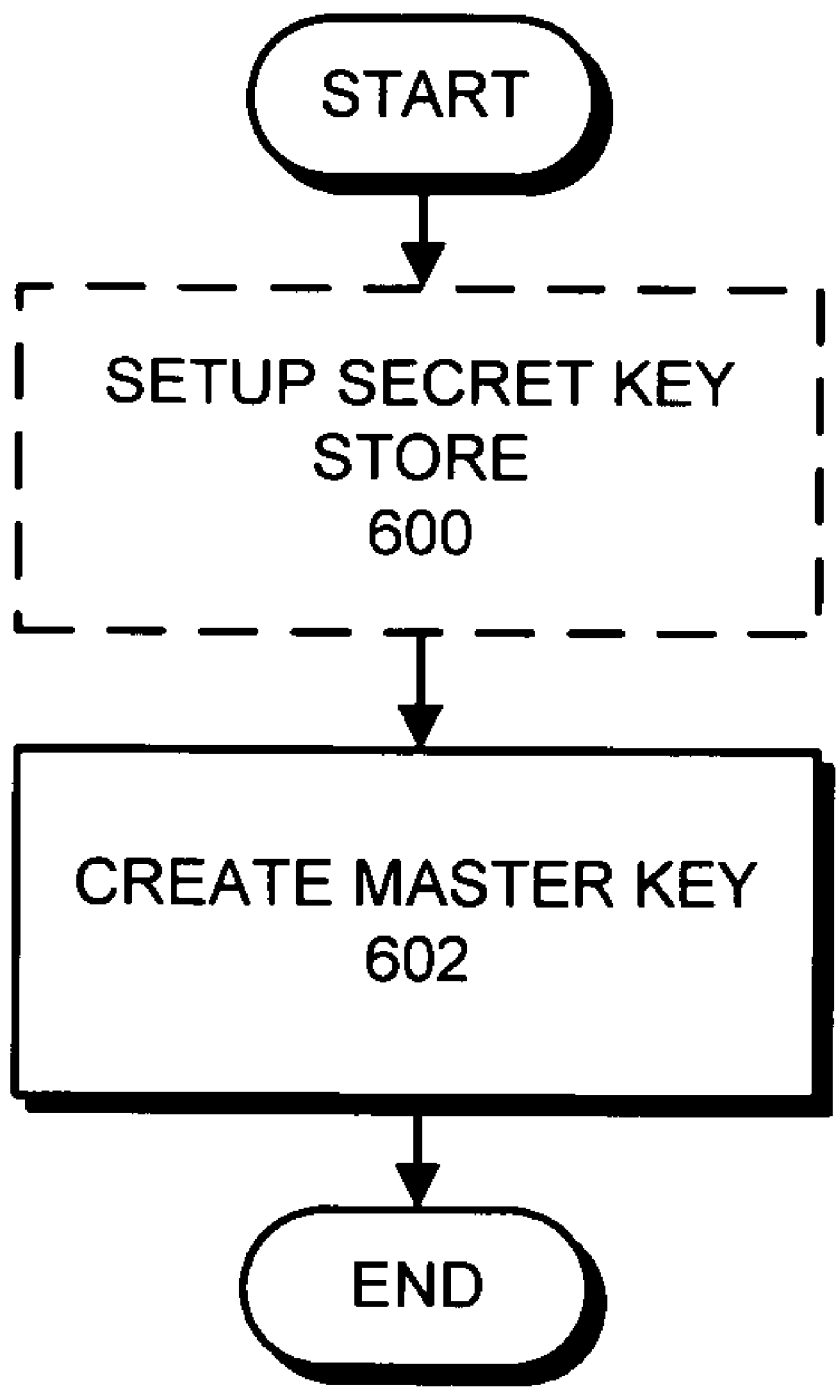
FIG. 6 presents a flowchart illustrating the process of setting up a key manager in accordance with an embodiment of the present invention.

FIG. 6 presents a flowchart illustrating the process of setting up a key manager in accordance with an embodiment of the present invention. The process begins with a system creating and configuring a secret key store in response to a request by an administrator (step 600). The secret key stored is used to store customer keys. The customer keys are retrieved by using a pointer stored in a token.

In one embodiment of the present invention, customer keys are stored in encrypted token form in the secret key store.

In one embodiment of the present invention, customer keys are stored in tokens sent to the clients. In this embodiment there is no need to setup a secret key store and therefore step 600 is optional (as indicated by the dashed lines).

The system creates the master key, in response to a request by the administrator. This master key is used by the key manager to encrypt the tokens (step 602). The master key can be generated by an administrator, or alternatively the key manager can be instructed by an administrator to generate a master key. If the key manager generates the master key, the master key may or may not be revealed to any client including an administrator, depending on the configuration.

Customer Key and Token Creation

Figure 7:
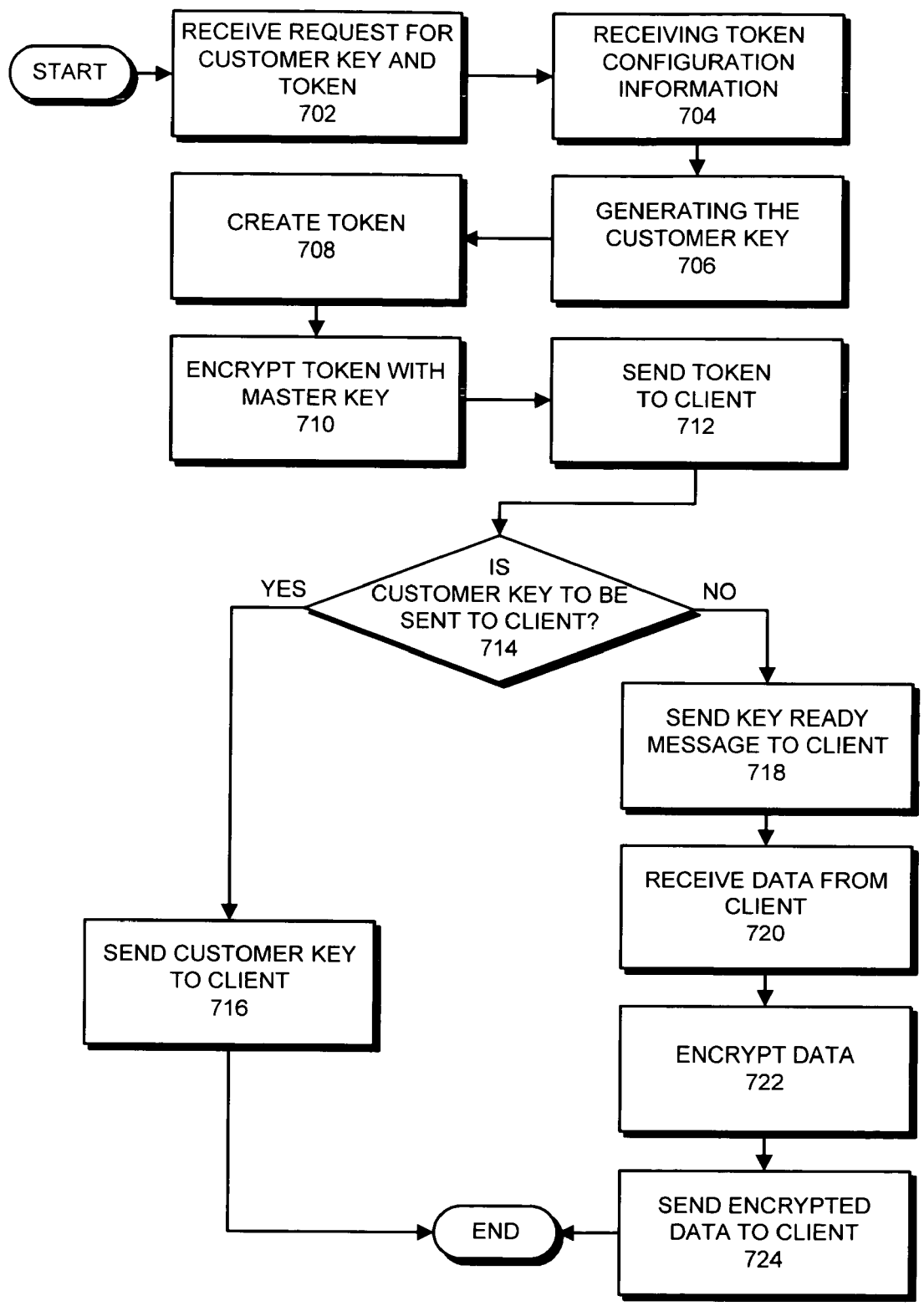
FIG. 7 presents a flowchart illustrating the process of creating a customer key and a token in accordance with an embodiment of the present invention.

FIG. 7 presents a flowchart illustrating the process of creating a customer key and a token in accordance with an embodiment of the present invention. The process begins with a key manager receiving a request for a customer key and a token (step 702). The key manager then receives the token configuration information from the client (step 704). Next, the key manager generates a customer key (step 706). The type of customer key that is generated is specified by token configuration information. The key manager then creates the token that is to be sent to the client (step 708). Next, the token is encrypted with the master key (step 710), and is then sent to the client (step 712). The key manager then examines the token configuration information to determine if the customer key is to be sent to the client (step 714). If so, the key manager sends the customer key to the client (step 716). If not, the key manager sends a message to the client alerting the client that the customer key is available for use (step 718). The key manager then receives data from the client (step 720). Next, the key manager encrypts the data that is received from the client (step 722). Finally, the key manager sends the encrypted data to the client (step 724).

In one embodiment of the present invention, the decision whether to send a customer key to a client is made by an administrator. In this embodiment, the key manager does not need to examine the token configuration information to determine if the customer key is to be sent to the client.

System Execution

Figure 8:
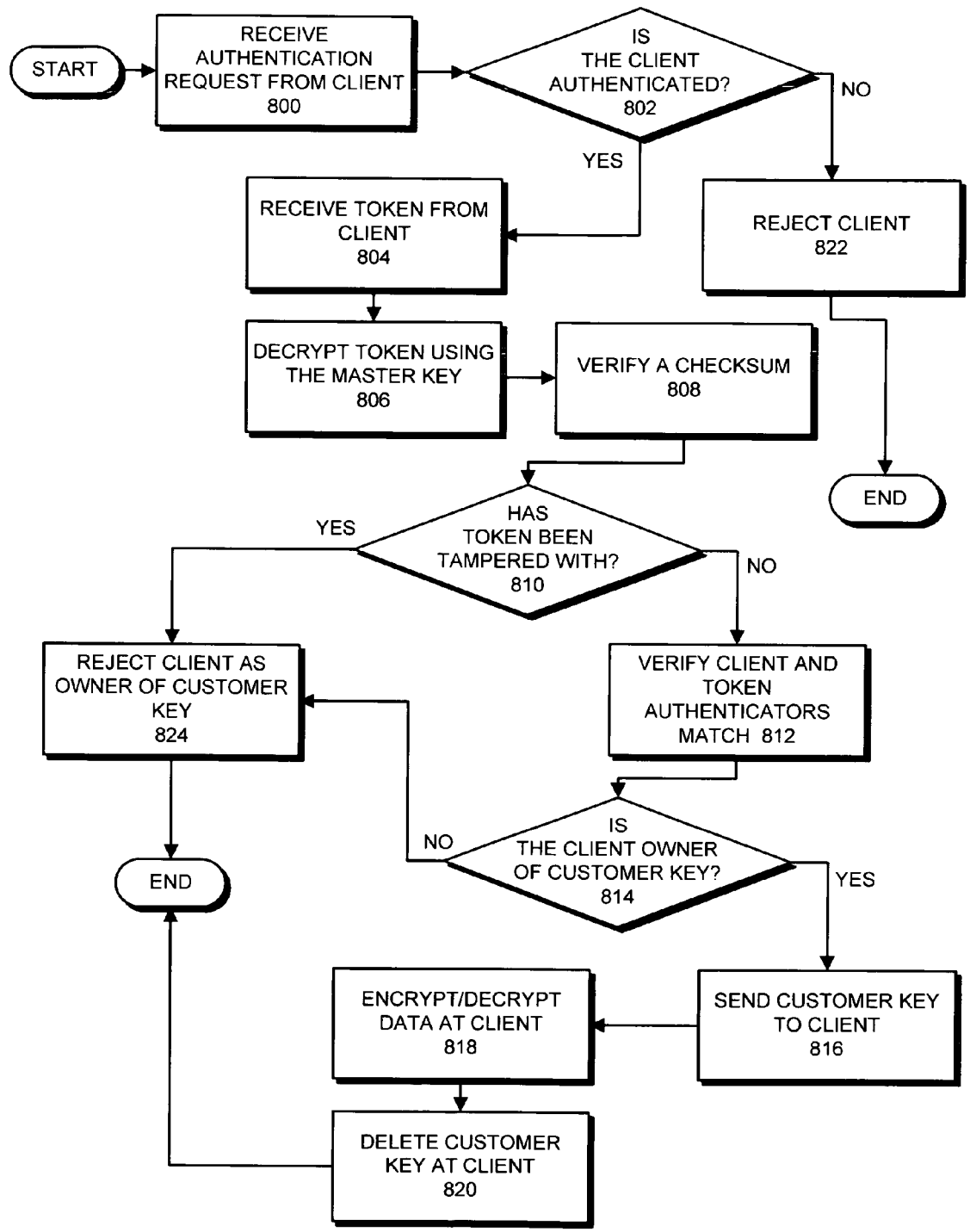
FIG. 8 presents a flowchart illustrating the process of using a token and a customer key in accordance with an embodiment of the present invention.

FIG. 8 presents a flowchart illustrating the process of using a token and a customer key in accordance with an embodiment of the present invention. The process begins with the key manager receiving an authentication request from a client (step 800). In response to this request, the key manager determines if the client is authenticated (step 802), which involves determining if a client has permission to use the key manager. In doing so, the key manager does not determine if a client has a valid token, nor does the key manager determine if the client owns the customer key associated with the token. However, information used to authenticate the client in step 802 may be used to facilitate determining customer key ownership.

If the client is not authenticated, the key manager rejects the client (step 822). On the other hand, if the client is authenticated to have permission to access the key manager, the key manager allows the client to proceed. The key manager then receives a token from the client (step 804). Next, the key manager decrypts the token using the master key (step 806).

In one embodiment of the present invention, the key manager receives decrypted portions of the token from the client. These decrypted portions are used to help decode the token, to verify the checksum, and to authenticate the client.

In one embodiment of the present invention, the key manager can utilize more than one master key. In this embodiment, the key manager determines which master key the token is encrypted with by looking at an unencrypted portion of the token.

In one embodiment of the present invention, the key manager can determine which master key the token is encrypted with by: examining key portions of the token; examining the length of the token, or any other means that can be used to discern which master key the token was encrypted with.

Once the token is decrypted, the key manager verifies a checksum (step 808). The key manager then determines if the token has been tampered with by examining the results of the checksum verification process (step 810). If the token is determined to have been tampered with, the key manager rejects the client as the owner of the customer key (step 824). If the token has not been tampered with, the key manager verifies the client authenticator (step 812). The key manager then determines if the client is the owner of the customer key by examining the results of the client authenticator verification process (step 814). If the client is not the owner of the customer key, the key manager rejects the client as the owner of the customer key (step 824). If the client is the owner of the customer key, the customer key is sent to the client (step 816). The customer key is then used to encrypt/decrypt data at the client (step 818). Finally, the customer key can be deleted at the client (step 820).

In one embodiment of the present invention, the customer key is not sent to the client. Instead, the key manager sends a message to the client indicating that the customer key is available for use by the client. The key manager then receives data from the client to be encrypted or decrypted. The key manager then encrypts or decrypts the information and sends the encrypted or decrypted information back to the client.

In one embodiment of the present invention, the token is only stored by the key manager and is not sent to the client. Following client authentication, the client can request a customer key by an identifier and the key manager can verify the token authenticator before returning the customer key to the client.

Checksum Verification

Figure 9:
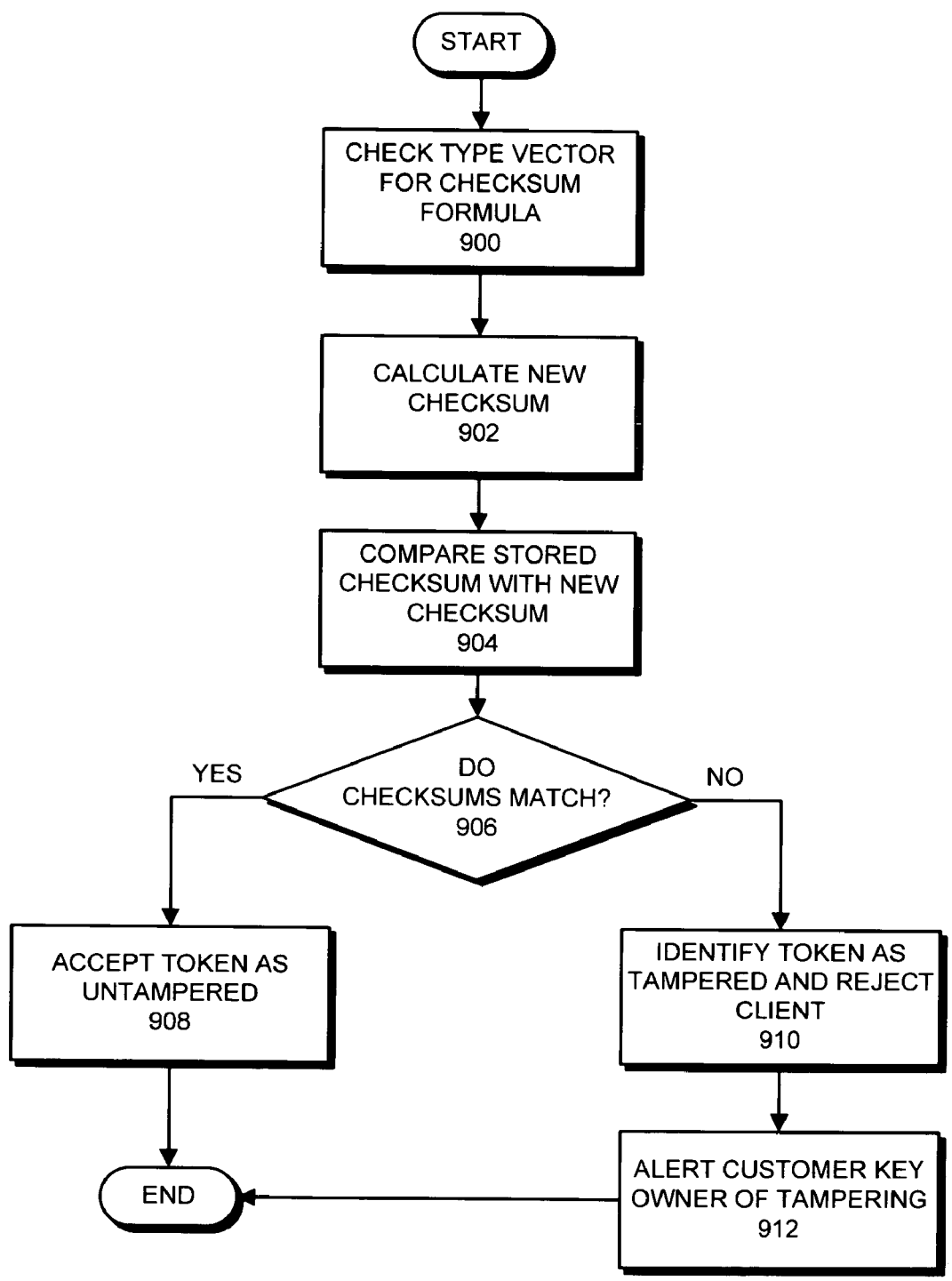
FIG. 9 presents a flowchart illustrating the process of verifying a checksum in accordance with an embodiment of the present invention.

FIG. 9 presents a flowchart illustrating the process of verifying a checksum in accordance with an embodiment of the present invention. The process begins with the key manager checking the type vector that is part of the token for the checksum formula used during creation of the token (step 900). The key manager then calculates a new checksum using the formula identified in the type vector and the token that was presented to the key manager (step 902). Next, the key manager compares the newly created checksum with the checksum which is stored in the token (step 904). The key manager then determines if the two checksums match (step 906). If so, the key manager accepts the token as being untampered (step 908). If not, the key manager identifies the token as being tampered and rejects the client that sent the token (step 910). The key manager then alerts the customer key owner, identified from the type vector, of the tampering of the token (step 912).

In one embodiment of the present invention, the checksum is a signature created using an asymmetric key. In this case, it may be impossible to duplicate the original checksum, but the signature will instead be verified.

In one embodiment of the present invention, the token must be decoded before the type vector can be analyzed. The token is decoded by combining decrypted portions of the token provided by the client with the token. The client specifies how to combine the token with the decrypted portions of the token received from the client.

In one embodiment of the present invention, the customer key owner is not alerted of the tampering of the token.

In one embodiment of the present invention, if any one of the steps to verify the checksum fails to execute properly, the token is considered tampered with and the key manager executes step 910.

In one embodiment of the present invention, if the token is mangled to the point that the customer key owner cannot be determined from the token, an administrator is alerted that a client has attempted to request a customer key using an invalid token.

In one embodiment of the present invention, a customer key owner is alerted about the receipt of a token at the key manager. In this embodiment, the customer key owner is alerted even if the key manager believes the client to be the rightful customer key owner. In the event that a client is able to successfully masquerade as the customer key owner, but does not alter the alert message stored in the token, this embodiment ensures that the customer key owner is alerted of the potential breach of privacy even if the breach of privacy was not prevented.

Client Authenticator Verification

Figure 10:
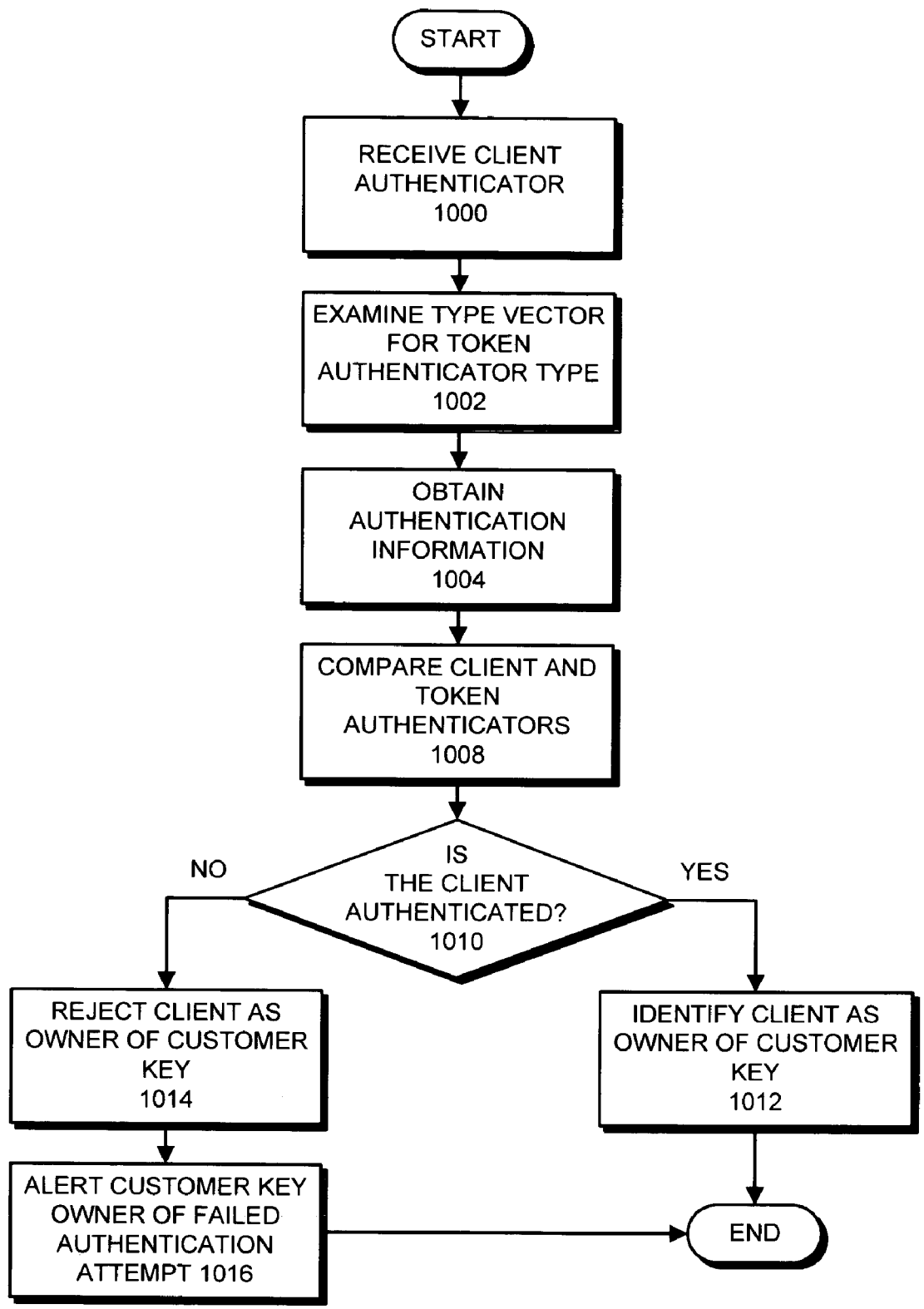
FIG. 10 presents a flowchart illustrating the process of verifying a client authenticator in accordance with an embodiment of the present invention.

FIG. 10 presents a flowchart illustrating the process of verifying a client authenticator in accordance with an embodiment of the present invention. This authentication process occurs to determine if a client that is attempting to retrieve a customer key is the owner of the customer key. This is an independent authentication process from the authentication process used to determine if the client has permission to access the key manager. In one embodiment of the present invention, information used to authenticate the client as having permission to access the key manager can also be used to authenticate the client as the owner of the customer key associated with the token received by the key manager from the client.

The process begins with the key manager receiving a client authenticator (step 1000). The key manager then examines the type vector for the token authenticator type (step 1002). The token authenticator type informs the key manager how to proceed in determining if the client is the owner of the customer key associated with the received token. Using the information from the token authenticator type, the key manager obtains the information needed to re-create the token authenticator as defined by the token authenticator type (step 1004). Typically, the key manager obtains the necessary information by querying the client. However, the information can also be obtained by examining client characteristics and examining the information the client used to authenticate to the key manager. Note that the information may also include biometric data. In one embodiment of the present invention, the client attempting to retrieve a customer key may also be required to supply other components of the token such as the token authenticator type, or the customer key type.

The token authenticator corresponds to the authenticated user, but may not necessarily be equal to the "client authenticator". For example, the client authenticator may be a username/password used to authenticate to the key manager. The token authenticator may just include the username and not the password.

The key manager compares the token authenticator stored in the token received from the client with the newly created client authenticator (step 1008). The key manager then determines if the two authenticators match (step 1010). If so, the key manager identifies the client as the owner of the customer key (step 1012). If not, the key manager rejects the client as the owner of the customer key (step 1014). The key manager then alerts the owner of the customer key of a failed authentication attempt (step 1016).

In one embodiment of the present invention, the token must be decoded before the type vector can be analyzed. The token is decoded by combining decrypted portions of the token provided by the client with the token. The client specifies how to combine the token with the decrypted portions of the token received from the client.

In one embodiment of the present invention, the customer key owner is not alerted of the failed authentication attempt.

In one embodiment of the present invention, if any one of the steps to authenticate a client as the owner of a customer key fails to execute properly, the client is considered to not be the owner of the customer key and the key manager executes step 1014.

Example Tokens

FIG. 11 illustrates examples of tokens in accordance with an embodiment of the present invention. Legend 1100 defines the symbols used in the example tokens.

To obtain the customer key from token 1102, a client must supply token 1102 to the key manager. Type vector B, herein referred to as type vector B' to differentiate between the client supplied type vector B' and the type vector B associated with token 1102, must also be supplied by the client to the key manager to obtain the customer key from token 1102. Lastly, the client must supply authenticator C, herein referred to as authenticator C' to differentiate between client authenticator C' and the token authenticator C associated with token 1102, to the key manager to obtain the customer key from token 1102. Once the key manager has obtained the required information from the client, the key manager decrypts the token using master key MK. Then the key manager performs the exclusive-OR operation on the concatenation of type vector B' and client authenticator C' with the beginning of decrypted token 1102. This results in a value that should be equivalent to customer key A, herein referred to as "customer key A'." Customer key A' is then hashed using a hash formula provided by the client. If the hash of customer key A' matches the hash of customer key A that is part of token 1102, then the key manager continues with step 812. If not, the key manager proceeds to step 824.

In one embodiment of the present invention, the client instructs the key manager on the process of decoding token 1102.

In one embodiment of the present invention, the process of decoding token 1102 is specified in type vector B' sent to the key manager by the client. In this embodiment, type vector B' may be in a key manager specific format that is not recognizable by the client, but has been provided to the client as a secondary token associated with token 1102.

In one embodiment of the present invention, the client does not send type vector B' to the key manager, but instead instructs the key manager on the creation of type vector B'.

Token 1104 is an example of the token format described in the previous sections of the instant application. Token 1104 does not require decoding before use and only requires the client to supply token 1104 and client authenticator C' to the key manager.

Token 1106 is similar to token 1102 and requires similar information from the client (token 1106, type vector B', and client authenticator C') as token 1102. The difference between token 1102 and token 1106 is during the checksum verification process. Token 1106 requires a more complex hash, as illustrated in FIG. 11, to verify that token 1106 has not been tampered with.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for managing keys, comprising:
   authenticating a client at a key manager;
   receiving a token from the client at the key manager, wherein the token indicates whether a customer key upon being decrypted is to be returned to the client or used by the key manager and includes one half of an authenticator pair used to determine whether the client is the owner of the customer key;
   decrypting the token using a master key;
   verifying that the client is the owner of the customer key based at least on a client authenticator received from the client, wherein the client authenticator comprises the other half of the authenticator pair; and
   in response to the token indicating that the customer key upon being decrypted is to be returned to the client, sending the customer key to the client, thereby allowing the client to use the customer key to encrypt or decrypt data.

2. The method of claim 1, further comprising creating the customer key and the token by:
   receiving a request for the customer key and for the token at the key manager, wherein the request may include a second client authenticator;
   generating the customer key;
   creating the token, wherein the second client authenticator is included in the token as the token authenticator;
   sending the customer key and the token to the client; and
   saving the token at the client.

3. The method of claim 1, further comprising configuring the key manager by:
   receiving a request from an administrator to setup a secret key store, wherein the secret key store is used by the key manager to store the customer key;
   in response to the request, setting up the secret key store; and
   creating a master key, wherein the master key is used by the key manager to encrypt/decrypt the token.

4. The method of claim 1, wherein the token can include:
   the customer key;
   the token authenticator;
   a type vector; and
   a checksum, wherein the checksum facilitates determining whether the token has been tampered.

5. The method of claim 1, wherein the token is encrypted with the master key, and wherein the master key can be generated randomly by the key manager or specified by an administrator.

6. The method of claim 1, wherein the token authenticator and the client authenticator can include at least one of:
   a user name;
   a password;
   a certificate;
   an Internet Protocol address of the client;
   a hard-coded identifier;
   an identification number;
   a question response;
   a formula result; and
   an integrity check of the authenticator.

7. The method of claim 1, wherein if token indicates that the customer key upon being decrypted is to be used by the key manager, sending a message to the client indicating that the customer key is available at the key manager for use by the client.

8. The method of claim 7, further comprising:
   receiving data from the client for encryption/decryption with the customer key; and
   sending to the client the encrypted/decrypted data from the centralized key manager.

9. The method of claim 2, further comprising sending the token but not the decrypted customer key to the client.

10. The method of claim 9, further comprising:
    receiving data from the client at the key manager for encryption with the customer key;
    sending the encrypted data to the client; and
    saving the token at the client.

11. The method of claim 1, wherein verifying that the client is the owner of the customer key based at least on the client authenticator further comprises:

receiving the client authenticator at the key manager;
examining a type vector to determine a token authenticator type, wherein the type vector is included in the token;
performing a client authentication technique, as indicated by the token authenticator type, to compare the token authenticator with the client authenticator;
if the token authenticator matches the client authenticator, identifying the client as the owner of the customer key; and
if not, rejecting the client as the owner of the customer key.

12. The method of claim 11, wherein the type vector stores configuration information that includes:
the token authenticator type, wherein the token authenticator type indicates the form of the token authenticator, wherein the form of the token authenticator indicates both the kind of token authenticator used and whether the token authenticator is hashed, encrypted, or in plain text;
a customer key management method;
an owner of the customer key;
an expiration value defining how long the token is valid;
a checksum-creation rule, wherein the checksum-creation rule indicates what part of the token is hashed, and what hash formula is implemented; and
a customer key type, wherein the customer key type indicates the kind of key used, and what functions the key can be used for.

13. The method of claim 1, further comprising verifying a checksum, wherein verifying the checksum involves determining if the token has been tampered with, and wherein verifying the checksum involves:
examining a type vector to determine a checksum-creation rule, wherein the type vector is included in the token authenticator;
calculating a second checksum, wherein the second checksum is created following the checksum-creation rule;
verifying the checksum and the second checksum;
if the checksum and the second checksum match, determining that the token has not been tampered with; and
if not, determining that the token has been tampered with and rejecting the client as the owner of the customer key.

14. A non-transitory computer-readable storage medium storing instructions that when executed by a computer cause the computer to perform a method for managing keys, the method comprising:
authenticating a client at a key manager;
receiving a token from the client at the key manager, wherein the token is indicates whether the customer key upon being decrypted is to be returned to the client or used by the key manager and includes one half of an authenticator pair used to determine whether the client is the owner of the customer key;
decrypting the token using a master key;
verifying that the client is the owner of the customer key based at least on a client authenticator received from the client, wherein the client authenticator comprises the other half of the authenticator pair; and
in response to the token indicates that the customer key upon being decrypted is to be returned to the client, sending the customer key to the client, thereby allow the client use the customer key to encrypt or decrypt data.

15. The non-transitory computer-readable storage medium of claim 14, wherein the method further comprises creating the customer key and the token by:
receiving a request for the customer key at the key manager, wherein the request may include a second client authenticator;
receiving a request for the token;
generating the customer key;
creating the token, wherein the second client authenticator is included in the token as the token authenticator;
sending the customer key and the token to the client; and
saving the token at the client.

16. The non-transitory computer-readable storage medium of claim 14, wherein the method further comprises configuring the key manager by:
receiving a request from an administrator to setup a secret key store, wherein the secret key store is used by the key manager to store the customer key;
in response to the request, setting up the secret key store; and
creating a master key, wherein the master key is used by the key manager to encrypt/decrypt the token.

17. The non-transitory computer-readable storage medium of claim 14, wherein the token can include:
the customer key;
the token authenticator;
a type vector; and
a checksum, wherein the checksum facilitates determining whether the token has been tampered.

18. The non-transitory computer-readable storage medium of claim 14, wherein the token is encrypted with the master key, and wherein the master key can be generated randomly by the key manager or specified by an administrator.

19. The non-transitory computer-readable storage medium of claim 14, wherein the token authenticator and the client authenticator can include at least one of:
a user name;
a password;
a certificate;
an Internet Protocol address of the client;
a hard-coded identifier;
an identification number;
a question response;
a formula result; and
an integrity check of the authenticator.

20. The non-transitory computer-readable storage medium of claim 14, wherein the key manager does not send the customer key to the client, but instead sends a message to the client indicating that the customer key is available at the key manager for use by the client resulting in the method further comprising:
receiving data from the client for encryption/decryption with the customer key; and
sending to the client the encrypted/decrypted data from the centralized key manager.

21. The non-transitory computer-readable storage medium of claim 15, wherein the key manager sends the token but not the customer key to the client, and wherein the method further comprises:
receiving data from the client at the key manager for encryption with the customer key;
sending the encrypted data to the client; and
optionally saving the token at the client.

22. The non-transitory computer-readable storage medium of claim 14, wherein verifying that the client is the owner of the customer key based at least on the client authenticator further comprises:
receiving the client authenticator at the key manager;
examining a type vector to determine a token authenticator type, wherein the type vector is included in the token;
performing a client authentication method, as indicated by the token authenticator type, to compare the token authenticator with the client authenticator;

if the token authenticator matches the client authenticator, identifying the client as the owner of the customer key; and if not, rejecting the client as the owner of the customer key.

23. The non-transitory computer-readable storage medium of claim 22, wherein the type vector stores configuration information that includes:

the token authenticator type, wherein the token authenticator type indicates the form of the token authenticator, wherein the form of the token authenticator indicates both the kind of token authenticator used and whether the token authenticator is hashed, encrypted, or in plain text;

a customer key management method;

an owner of the customer key;

an expiration value defining how long the token is valid;

a checksum-creation rule, wherein the checksum-creation rule indicates what part of the token is hashed, and what hash formula is implemented; and a customer key type, wherein the customer key type indicates the kind of key used, and what functions the key can be used for.

24. The non-transitory computer-readable storage medium of claim 14, wherein the method further comprises verifying a checksum, wherein verifying the checksum involves determining if the token has been tampered with, and wherein verifying the checksum involves:

examining a type vector to determine a checksum-creation rule, wherein the type vector is included in the token authenticator;

calculating a second checksum, wherein the second checksum is created following the checksum-creation rule;

verifying the checksum and the second checksum;

if the checksum and the second checksum match, determining that the token has not been tampered with; and if not, determining that the token has been tampered with and rejecting the client as the owner of the customer key.

25. An apparatus for managing keys, comprising:

a key manager;

a client;

a token;

an authentication mechanism configured to authenticate the client;

a receiving mechanism configured to receive a token from the client at the key manager, wherein the token indicates whether the customer key upon being decrypted is to be returned to the client or used by the key manager and includes one half of an authenticator pair used to determine whether the client is the owner of the customer key;

a decrypting mechanism configured to decrypt the token using the master key;

a verifying mechanism configured to verify that the client is the owner of the customer key based at least on a client authenticator received from the client, wherein the client authenticator comprises the other half of the authenticator pair; and a sending mechanism configured to send the customer key to the client to allow the client to use the customer key to encrypt or decrypt data and to delete the customer key after encryption or decryption if the token indicates that the customer key upon being decrypted is to be returned to the client.

* * * * *

UNITED STATES PATENT AND TRADEMARK OFFICE
CERTIFICATE OF CORRECTION

| | | |
|---|---|---|
| PATENT NO. | : 7,925,023 B2 | |
| APPLICATION NO. | : 11/367812 | |
| DATED | : April 12, 2011 | |
| INVENTOR(S) | : Youn et al. | |

It is certified that error appears in the above-identified patent and that said Letters Patent is hereby corrected as shown below:

In column 5, line 23, delete "10" and insert -- 110 --, therefor.

Signed and Sealed this
Eleventh Day of October, 2011

David J. Kappos
*Director of the United States Patent and Trademark Office*